US008451451B2

(12) United States Patent
Salit et al.

(10) Patent No.: US 8,451,451 B2
(45) Date of Patent: May 28, 2013

(54) ENHANCED SCALE FACTOR RING LASER GYROSCOPE WITH LASING FREQUENCIES AWAY FROM CENTER OF GAIN PROFILE (75) Inventors: Mary Salit, Plymouth, MN (US); Kenneth Salit, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 206 days.

(21) Appl. No.: 12/755,623

(22) Filed: Apr. 7, 2010

(65) Prior Publication Data
US 2011/0249268 A1    Oct. 13, 2011

(51) Int. Cl.
*G01C 19/68*    (2006.01)
(52) U.S. Cl.
USPC .................................................. 356/473
(58) Field of Classification Search
USPC ............................................ 356/459–476
See application file for complete search history.

(56) References Cited

U.S. PATENT DOCUMENTS

| 4,632,555 | A | | 12/1986 | Malvern |
| 5,489,981 | A | * | 2/1996 | Killpatrick et al. ............ 356/459 |
| 5,548,602 | A | * | 8/1996 | Podgorski et al. .............. 372/19 |
| 7,058,111 | B2 | | 6/2006 | Seiber |
| 7,804,600 | B1 | | 9/2010 | Smith |
| 2010/0014091 | A1 | | 1/2010 | Strabley |

OTHER PUBLICATIONS

Shahriar et al., "Ultrahigh Precision Absolute and Relative Rotation Sensing using Slow and Fast Light", "Quantum Information Technology http://www.rle.mit.edu/quantummuri/publications/Additions4_05/Shahriar_8.pdf accessed Aug. 5, 2010", 2005, Publisher: Northwestern University.
Pati et al., "Simultaneous Slow and Fast Light Effects Using Probe Gain and Pump Depletion Via Raman Gain in Atomic Vapor", 2008, pp. 1-6, Publisher: Optical Society of America.
Pati et al., "Simultaneous Generation of Slow and Fast Light for Raman Coupled Beams", "Advances in Slow and Fast Light", 2008, pp. 69040L-1 thru 69040L-7, vol. 6904, Publisher: SPIE.
Phillips, "Spatially-Resolved Temperature Diagnostic for Supersonic Flow Using Cross-Beam Doppler-Limited Laser Saturation Spectros", Mar. 2006, pp. 1-185, Publisher: Air Force Institute of Technology, Published in: Wright-Patterson Air Force Base, Ohio.
Rabeendran, "A Study of Ring Laser Gyroscopes", 2008, pp. i-88, Publisher: University of Canterbury.

(Continued)

*Primary Examiner* — Hwa Lee
(74) *Attorney, Agent, or Firm* — Fogg & Powers LLC (57) ABSTRACT A ring laser gyroscope that includes a cavity containing a gain medium, a plurality of reflective surfaces coupled to the cavity, and at least one medium exciter operable to excite the gain medium. The gain medium has naturally dispersive properties associated with an index of refraction. The reflective surfaces include at least a first reflective surface, a second reflective surface, and a third reflective surface. The first, second, and third reflective surfaces are positioned to reflect light between the plurality of reflective surfaces. The excited gain medium induces first and second laser fields within the cavity. The first and second laser fields operate at a lasing frequency corresponding to a negative slope of the index of refraction associated with the dispersive properties of the gain medium. The gain medium causes anomalous dispersion of the first and second laser fields passing through the gain medium.

14 Claims, 6 Drawing Sheets

OTHER PUBLICATIONS

Shahriar et al., "Ultrahigh Precision Absolute and Relative Rotation Sensing using Slow and Fast Light", "Quantum Information Technology http://www.rle.mit.edu/quantummuri/publications/Additions4_05/Shahriar_8.pdf accessed Aug. 5, 2010", 2005, pp. 1-5, Publisher: Northwestern University.

Slagmolen, "Phase-Sensitive Reflection Technique for Characterization of a Fabry-Perot Interferometer", "Applied Optics", Jul. 20, 2000, pp. 3638-3643, vol. 39, No. 21, Publisher: Optical Society of America.

Smith et al., "Dispersion-enhanced laser gyroscope", "Physical Review A", 2008, pp. 053824-1 thru 053824-9, vol. 78, No. 053824, Publisher: The American Physical Society.

Terrel, "Ring-Coupled Mach-Zehnder Interferometer Optimized for Sensing", "Applied Optics", Sep. 1, 2009, pp. 4874-4879, vol. 48, No. 26, Publisher: Optical Society of America.

Shariar et al., "Ultrahigh Precision Absolute and Relative Rotation Sensing using Fast and Slow Light, Version 1", "Available at http://arxiv.org/pdf/quant-ph/0505192v1", May 2005, pp. 1-6, Publisher: arXiv.org.

Shariar et al., "Ultrahigh Precision Absolute and Relative Rotation Sensing using Fast and Slow Light, Version 2", "Available at http://arxiv.org/pdf/quant-ph/0505192v2", Jul. 2005, pp. 1-11, Publisher: arXiv.org.

Shariar et al., "Ultrahigh Precision Absolute and Relative Rotation Sensing using Fast and Slow Light, Version 3", "Available at http://arxiv.org/pdf/quant-ph/0505192v3", Oct. 2006, pp. 1-24, Publisher: arXiv.org.

Shariar et al.,, "Ultrahigh Precision Absolute and Relative Rotation Sensing using Fast and Slow Light, Version 4", "Available at http://arxiv.org/pdf/quant-ph/0505192v4", Feb. 2007, pp. 1-28, Publisher: arXiv.org.

Shariar et al., "Ultrahigh Precision Absolute and Relative Rotation Sensing using Fast and Slow Light, Version 5", "Available at http://arxiv.org/pdf/quant-ph/0505192v5", Mar. 2007, pp. 1-28, Publisher: arXiv.org.

Aronowitz, "Fundamentals of the Ring Laser Gyro", "http://ftp.rta.nato.int/Public/PubFullText/RTO/AG/RTO-AG-339/$AG-339-03.PDF", Apr. 28, 2000, pp. 3-1 thru 3-45, Publisher: NATO Research and Technology Organisation.

Karapetyan, "Advanced Configuration of Gravitational-Wave Interferometer on the Base of 'Sensitive Mode' in 'White-Light Cavity'", "Optics Communications 219 (2003)", 2003, pp. 335-340, Publisher: Elsevier Science B.V.

Pati et al., "Demonstration of Displacement-Measurement-Sensitivity Proportional to Inverse Group Index of Intra-Cavity Medium in a Ring Resonator", "Optics Communications 281 (2008)", 2008, pp. 4931-4935, Publisher: Elsevier B.V.

Pati et al., "Simultaneous Slow and Fast Light Effects Using Probe Gain and Pump Depletion Via Raman Gain in Atomic Vapor", 2008, Publisher: Optical Society of America.

Pati et al., "Demonstration of a Tunable-Bandwidth White Light Interferometer using Anomalous Dispersion in Atomic Vapor", Sep. 2, 2007, Publisher: Northwestern University.

Rinkleff et al., "The Concept of White Light Cavities Using Atomic Phase Coherence", "Physica Scripta", 2005, pp. 85-88, vol. T118, Publisher: Physica Scripta.

Salit et al., "Fast-Light for Astrophysics: Super-Sensitive Gyroscopes and Gravitational Wave Detectors", "Journal of Modern Optics", Nov. 10-20, 2007, pp. 2425-2440, vol. 54, No. 16-17, Publisher: Taylor & Francis.

Shahriar et al., "Ultrahigh Enhancement in Absolute and Relative Rotation Sensing Using Fast and Slow Light", "Physical Review", 2007, pp. 053807-1 thru 053807-10, vol. A, No. 75, Publisher: The American Physical Society.

Shahriar et al., "Ultrahigh Precision Absolute and Relative Rotation Sensing Using Fast and Slow Light", "Quantum Information Technology", Oct. 23, 2002, Publisher: MIT.

Shahrian et al., "Application of Fast-Light in Gravitational Wave Detection with Interferometers and Resonators", "Journal of Modern Optics", Nov. 10-20, 2008, pp. 3133-3147, vol. 55, No. 19-20, Publisher: Taylor & Francis.

Smith et al., "Dispersion-enhanced Laser Gyroscope", "Physical Review A 78, 053824", 2008, pp. 053824-1 thru 053824-9, Publisher: The American Physical Society.

Tripathi et al., "Experimental Constraints of Using Slow-Light in Sodium Vapor for Light-Drag Enhanced Relative Rotation Sensing", "Optics Communications", Oct. 15, 2006, pp. 604-608, vol. 266, No. 2, Publisher: Elsevier B.V.

Wicht et al., "White-Light Cavities, Atomic Phase Coherence, and Gravitational Wave Detectors", "Optics Communications", Jan. 15, 1997, pp. 431-439, vol. 134, Publisher: Elsevier Science B.V.

Wise et al., "Linewidth-Broadened Fabry-Perot Cavities within Future Gravitational Wave Detectors", "Classical and Quantum Gravity", 2004, pp. S1031-S1036, vol. 21, Publisher: Institute of Physics Publishing.

Yum et al., "Fast-Light in a Photorefractive Crystal for Gravitational Wave Detection", "Optics Express", Dec. 8, 2008, pp. 20448-20456, vol. 16, No. 25, Publisher: Optical Society of America.

* cited by examiner

ENHANCED SCALE FACTOR RING LASER GYROSCOPE WITH LASING FREQUENCIES AWAY FROM CENTER OF GAIN PROFILE

CROSS-REFERENCE TO RELATED APPLICATIONS

The present application is related to commonly assigned and co-pending U.S. patent application Ser. No. 12/173,777 (hereafter "the '777 Application") entitled "AN ENHANCED SCALE FACTOR RING LASER GYROSCOPE", filed on Jul. 15, 2008. The '777 Application is also incorporated herein by reference in its entirety.

BACKGROUND

Ring laser gyroscopes are navigation instruments used to measure rotation rates about an axis of rotation. A ring laser gyroscope typically includes a closed cavity and at least three mirrors designed to reflect light in a loop. Light travels through the closed cavity in both a clock-wise ("CW") and a counter clock-wise ("CCW") direction. When the ring laser gyroscope is stationary, a beam of light traveling through the cavity in the CW direction has the same frequency as a beam of light traveling through the cavity in the CCW direction.

When the ring laser gyroscope is rotating, the frequency of the CW beam is different than that of the CCW beam. Utilizing the Sagnac effect, the frequency difference between a first beam traveling in the CW direction and a second beam traveling in the CCW direction is calculated. This is called resonant frequency splitting.

The rotation rate of gyroscope is proportional to the frequency difference between the CW beam and the CCW beam. The constant of proportionality between the resonant frequency splitting and the rotation rate is the scale factor. The scale factor is a scaling constant that determines how much signal a given rotation rate generates. The scale factor is normally proportional to the area of the device, so that a tradeoff exists between size and performance. The performance of a ring laser gyroscope depends on its scale factor.

SUMMARY

One embodiment of a ring laser gyroscope discussed herein includes a cavity containing a gain medium, a plurality of reflective surfaces coupled to the cavity, and at least one medium exciter operable to excite the gain medium. The gain medium has naturally dispersive properties associated with an index of refraction. The reflective surfaces include at least a first reflective surface, a second reflective surface, and a third reflective surface. The first, second, and third reflective surfaces are positioned to reflect light between the plurality of reflective surfaces. The excited gain medium induces first and second laser fields within the cavity. The first and second laser fields operate at a lasing frequency corresponding to a negative slope of the index of refraction associated with the dispersive properties of the gain medium. The gain medium causes anomalous dispersion of the first and second laser fields passing through the gain medium.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and in the specification is not to be construed as limiting the order in which the individual steps may be performed. The following detailed description is, therefore, not to be taken in a limiting sense.

The ring laser gyroscopes described herein increase the scale factor without increasing the area of the device through fast light dispersion. In example gyroscopes described below, an additional frequency dependent phase shift is introduced within a laser cavity. This phase shift can be introduced by any dispersive element under certain conditions. One of these conditions is that the total round trip optical phase in the cavity does not vary with optical frequency to the first order. This condition is met by some types of anomalous dispersion. Thus, the fast light laser gyroscopes described herein leverage anomalous dispersion to increase the scale factor. This specification generally describes using a laser operating in a continuous wave mode.

Increasing the scale factor using fast light dispersion allows for miniaturization of navigation grade gyros, enabling a potential cost reduction as well. Increasing the scale factor also reduces the "dead band" in traditional Helium-Neon ("HeNe") based ring laser gyroscopes. This reduction in "dead band" may eliminate the need for a dither motor with associated savings in production costs and reduction in noise. The increase in scale factor without respect to area of the ring laser gyroscope allows the use of ring laser gyroscopes in applications requiring small devices.

Figure 1:
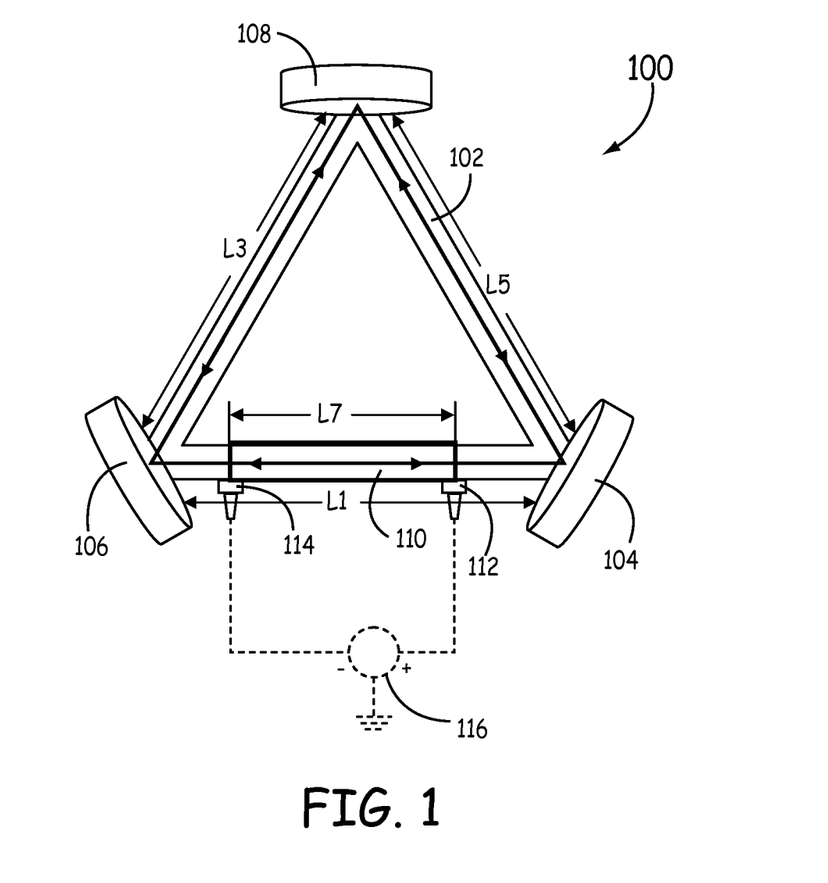
FIG. 1 is a block diagram depicting an exemplary embodiment of a fast light ring laser gyroscope with an enhanced scale factor.

FIG. 1 is a block diagram depicting an exemplary fast light ring laser gyroscope 100 having an enhanced scale factor. The gyroscope 100 includes an interior cavity 102 filed with a HeNe gas. The interior cavity 102 forms an equilateral triangle. A first mirror 104 is positioned at a first corner of the triangle. A second mirror 106 is positioned at a second corner of the triangle. A third mirror 108 is positioned at a third corner of the triangle. The length of the cavity 102 between mirror 104 and mirror 106 is L1. The length of the cavity 102 between mirror 106 and mirror 108 is L3. The length of the cavity 102 between mirror 108 and mirror 104 is L5. In other embodiments, the interior cavity 102 forms other shapes and/ or greater or fewer mirrors are used in the gyroscope 100. While mirrors are described in this embodiment, other embodiments may use other reflective surfaces.

A portion of HeNe gas in the cavity 102 of length L7 between mirror 104 and mirror 106 is converted into a gain medium 110 by exciting the Helium and Neon atoms. The Helium and Neon atoms are excited by inducing a current across the length L7. The current is induced using electrode 112 and electrode 114 powered by a power source 116. The power source 116 applies a current between electrode 112 and electrode 114. In one non-limiting exemplary embodiment, electrode 112 is a cathode and electrode 114 is an anode. The portion of the HeNe gas is thus excited into the gain medium 110 using a medium exciter including electrode 112 and electrode 114. The excited Helium atoms collide with the Neon atoms which produce fluorescence and stimulated emission. The gain medium 110 induces light that propagates in both the CW and CCW directions through the cavity 102 of the gyroscope 100. The light propagating through the cavity 102 of the gyroscope 100 constructively interferes with itself to create two counter rotating beams, one traveling in the CW direction and the other traveling in the CCW direction, both with a wavelength of approximately 633 nanometers, in this example, while the gyroscope 100 is stationary. These beams are also sometimes referred to by other names, such as laser fields, light fields, or laser beams. Light from both of the beams is tapped off through one of the mirrors and interfered with each other to determine the frequency difference between the CW and CCW beams. To avoid confusion in the drawings, the structure for tapping and interfering the two laser beams is not shown. The tapping of the laser beams occurs pursuant to established procedures. In other embodiments, different amounts of electrodes or other methods and medium exciters are used to excite the gain medium in the cavity 102. For example, in some embodiments optical pumping is used to excite a crystalline solid gain medium.

Figure 4:
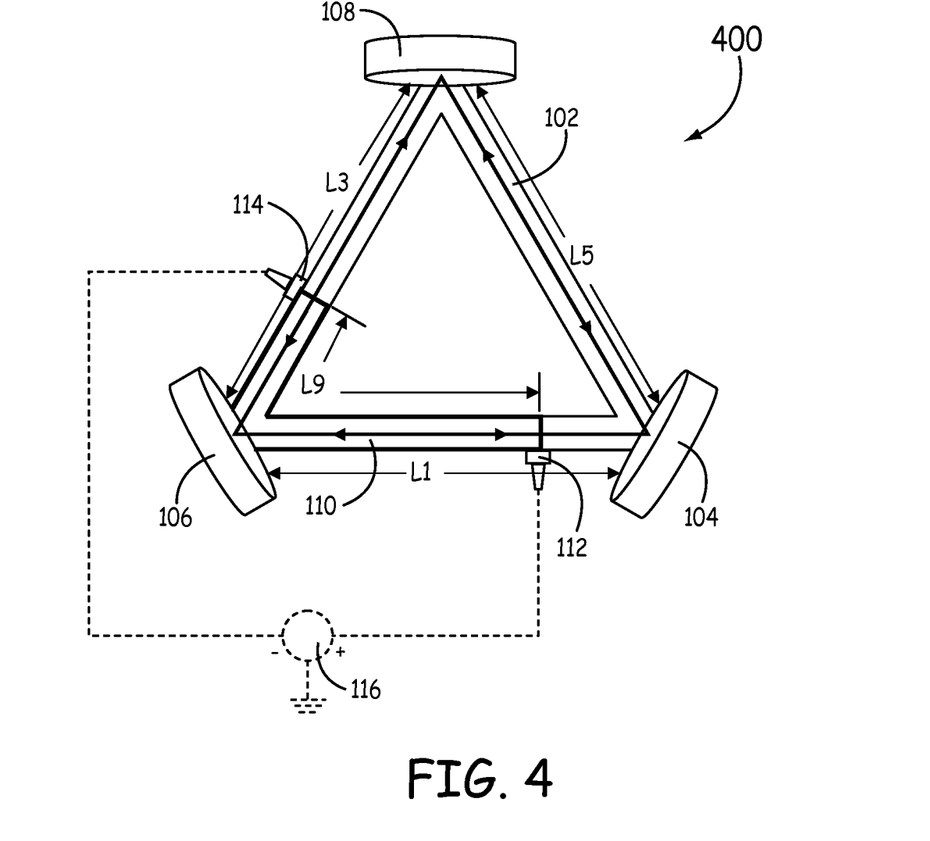
FIG. 4 is a block diagram depicting another exemplary embodiment of a fast light ring laser gyroscope with an enhanced scale factor.

The gain medium 110 also has properties of natural dispersion. Specifically, the gain medium 110 filling the cavity 102 between mirror 104 and mirror 106 for length L7 (or length L9 in gyroscope 400) has an index of refraction of n(ω). These properties of natural dispersion are exploited by gyroscope 100 to increase the scale factor without increasing the area of the gyroscope 100 as described below.

Figure 2:
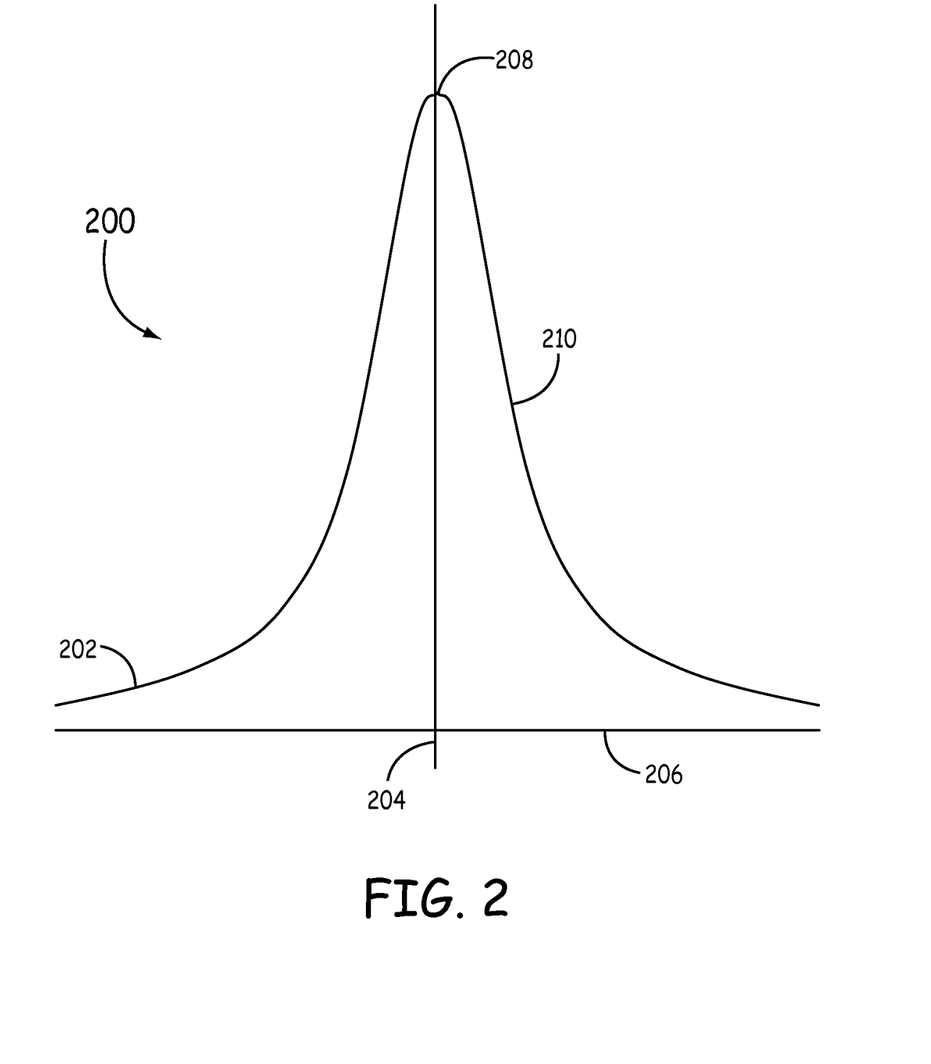
FIG. 2 shows a graph of a gain profile of an example embodiment of a fast light ring laser gyroscope.
Figure 3:
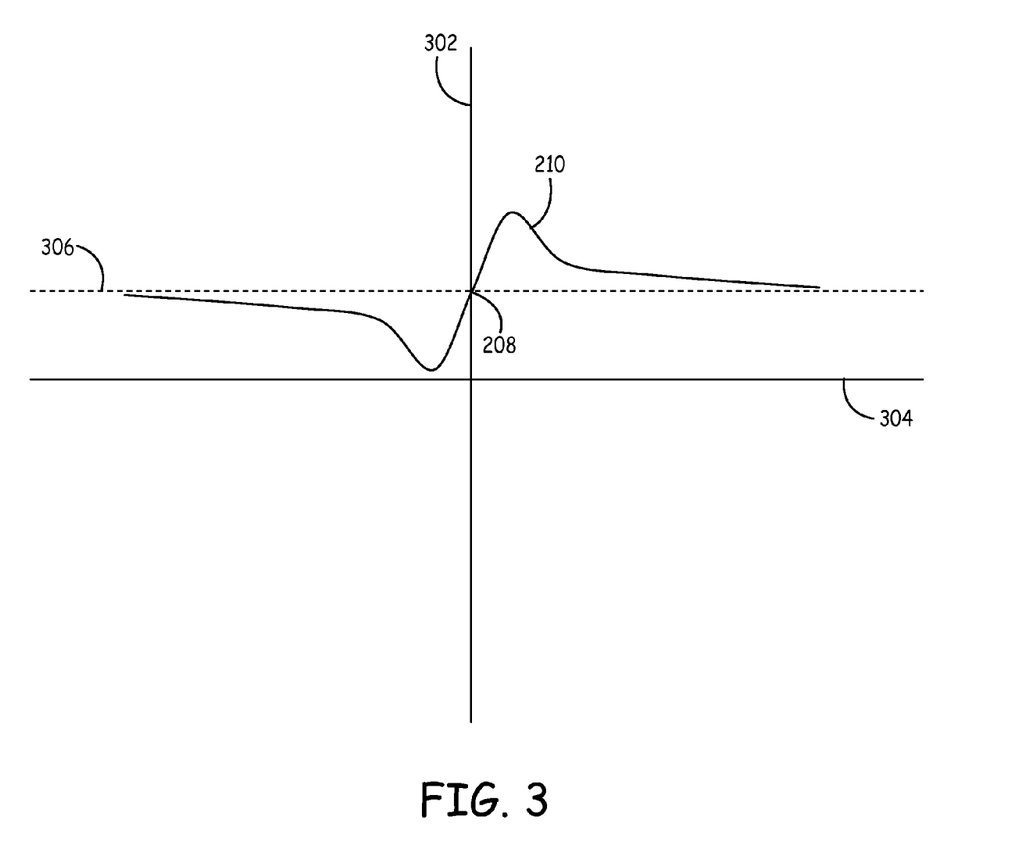
FIG. 3 shows a graph of an index of refraction of an example embodiment of a fast light ring laser gyroscope.

The index of refraction n(ω) is given by the following equation:

$$n(\omega) = 1 + \frac{c}{\pi} \int_0^\infty \frac{\alpha(\omega')}{\omega'^2 - \omega^2} d\omega', \qquad (eq.\ 1)$$

where ω is the frequency, c is the speed of light, and α is the gain. When the slope of the index of refraction n(ω) is negative, the desired phase shift can be induced to increase the scale factor. The slope of the index of refraction n(ω) can be found by taking the derivative of the index of refraction n(ω). Thus, in this embodiment, the gyroscope 100 is configured to operate in a range of frequencies where the naturally occurring slope of the index of refraction n(ω) is negative, as explained in more detail below with respect to FIG. 2 and FIG. 3.

FIG. 2 shows an exemplary graph 200 of the gain profile 202 of the gyroscope 100. The gain profile 202 is plotted on the graph 200 as amplitude (Y axis 204) as a function of frequency (X axis 206). When the gyroscope is not rotating, the gain profile 202 has the greatest amplitude at a stationary resonant frequency 208. The graph 200 is centered at the stationary resonant frequency 208. Thus, the stationary resonant frequency 208 is on the Y axis 204 and at the center of the gain profile 202. Because greater amplitudes are desirable in gyroscope design, conventional gyroscopes are typically designed to operate at or near the center of the gain profile 202 at the stationary resonant frequency 208.

In contrast to conventional gyroscopes, gyroscope 100 is designed to operate away from the center of the gain profile 202, and thus away from the stationary resonant frequency 208, in order to exploit the properties of natural dispersion of the gain medium 110. The slope of the index of refraction n(ω) is positive near the center of the gain profile 202 at the stationary resonant frequency 208. As noted above, when the slope of the index of refraction n(ω) is negative, the desired phase shift in the laser light traveling in cavity 102 can be induced to increase the scale factor. While not apparent from graph 200 alone, the slope of the index of refraction n(ω) is negative at off-resonant frequency 210 as described below.

FIG. 3 shows an exemplary graph 300 of the index of refraction of the gain medium 110 of the gyroscope 100. The graph 300 plots the amplitude of the index of refraction (Y axis 302) as a function of frequency (X axis 304). The graph 300 is also centered horizontally at the stationary resonant frequency 208, so that the stationary resonant frequency 208 is on the Y axis. The graph 300 is further centered vertically around line 306 at y=1. While the index of refraction has a positive slope at or near the stationary resonant frequency 208, it has a negative slope off of the stationary resonant frequency 208. Thus, the example gyroscope 100 operates at the off-resonant frequency 210, where the slope of the index of refraction n(ω) is negative. Thus, the gyroscope 100 operates at the off-resonant frequency 210 while it is stationary. It should also be noted that there are a range of available off-resonant frequencies on both sides of the Y axis 302 where the index of refraction n(ω) has a negative slope.

Because the gyroscope 100 operates at a frequency where the gain medium 110 has a negative slope of index of refraction n(ω), the dispersion caused by the gain medium 110 is anomalous dispersion. Anomalous dispersion is present when the index of refraction increases with increasing wavelength. If the slope of index of refraction n(ω) was positive, the dispersion would be normal dispersion. Normal dispersion occurs when the index of refraction decreases with increasing wavelength. Because the gain medium causes anomalous dispersion, it enables the total round trip optical phase in the cavity to vary less as a function of optical frequency than it would in free space to the first order. In some example embodiments, the total round trip optical phase in the cavity does not vary at all with optical frequency to the first order. As a result of the rotation, the effective length of the cavity changes so that the resonant frequency in the stationary cavity no longer experiences a phase shift of two pi. In addition, neighboring frequencies also experience non-resonant round trip phase.

Since the phase varies more slowly with frequency than in free space or in the center of the gain profile, the resonant frequencies will differ from the stationary resonant frequency by a greater amount. The factor by which the frequency shifts with rotation rate is thus enhanced. This factor is known as the scale factor because it is generally proportional to the size of the device. Both the length L7 (or L9 below) of the gain medium 110 and the choice of off-resonant frequency 210 are adjusted to achieve the desired scale factor.

In addition, the gain medium 110 in a laser with multiple amplified reflections passing through it has a different index of refraction than it would if it were only interacting with a single beam for one pass. Specifically, the gain medium 110 is saturated by the high intensities of laser light inside the interior cavity 102. This saturation of the gain medium 110 causes the index of refraction n(ω) to change. Thus, the index of refraction n(ω) is calculated for the saturated gain medium 110, where the saturation condition is determined by the losses in the interior cavity 102.

The index of refraction n(ω) is associated with the phase profile according to the following equation:

$$\phi_{round-trip} = \frac{2\pi}{\lambda}(nl_1 + L_{gyro} - l_1), \quad \text{(eq. 2)}$$

where $\phi_{round-trip}$ is the phase shift due to a single pass through the saturated gain medium 110, λ is the wavelength of the light, n is the index of refraction of the saturated gain medium 110, $l_1$ is the length light travels through the saturated gain medium 110 during one loop through the cavity 102 of the gyroscope 100 while stationary, and $L_{gyro}$ is the total length light travels during one loop through the cavity 102 of the gyroscope 100 while stationary.

The expression for the index of refraction n(ω) of the gain medium 110 given in equation 1 can be used to select an acceptable off-resonant frequency 210 between zero and a negative value according to the following equation:

$$0 \geq \frac{dn_1}{d\omega}\bigg|_{\omega_0} \geq -\frac{L_{gyro}}{l_1\omega_0}, \quad \text{(eq. 3)}$$

where ω is the frequency, $n_1$ is the index of refraction of the saturated gain medium 110, $\omega_0$ is the stationary resonant frequency 208, $l_1$ is the length light travels through the saturated gain medium 110 during one loop through the cavity 102 of the gyroscope 100 while stationary, and $L_{gyro}$ is the total length light travels during one loop through the cavity 102 of the gyroscope 100 while stationary.

Equation 3 indicates the conditions on index of refraction for which scale factor is enhanced, but neither the degree of enhancement nor the dynamic range over which the enhancement operates is constant. Enhancement of the scale factor generally occurs for index slopes between zero and the negative value given by solving for the right side of equation 3. The degree of enhancement is zero for a slope of zero. The degree of enhancement increases as the slope of the index approaches the negative value given by solving for the right side of equation 3. The scale factor enhancement and the dynamic range over which the enhancement operates are inversely related. As the scale factor enhancement approaches infinity, the dynamic range approaches zero. The scale factor enhancement approaches infinity when the index slope approaches the negative value given by solving for the right side of equation 3.

FIG. 4 is a block diagram depicting another exemplary fast light ring laser gyroscope 400 having an enhanced scale factor. As with gyroscope 100, the gyroscope 400 includes the interior cavity 102 filed with a HeNe gas, the first mirror 104, the second mirror 106, the third mirror 108, and the gain medium 110. The gyroscope 400 differs from gyroscope 100 in that the gain medium 110 in gyroscope 400 fills portions of the cavity 102 between mirror 106 and mirror 108 in addition to portions of the cavity 102 between mirror 104 and mirror 108. Electrode 112 and electrode 114 are positioned so that the current induced spans the desired length of the cavity. The total length of the gain medium 110 in gyroscope 400 is L9. In other embodiments, smaller or larger portions of HeNe gas in the cavity 102 are converted into a gain medium 110 by inducing a current across other lengths. While the description above focuses on gyroscope 100, it applies to various lengths of gain medium 110 filling various portions of the interior cavity 102.

Figure 5:
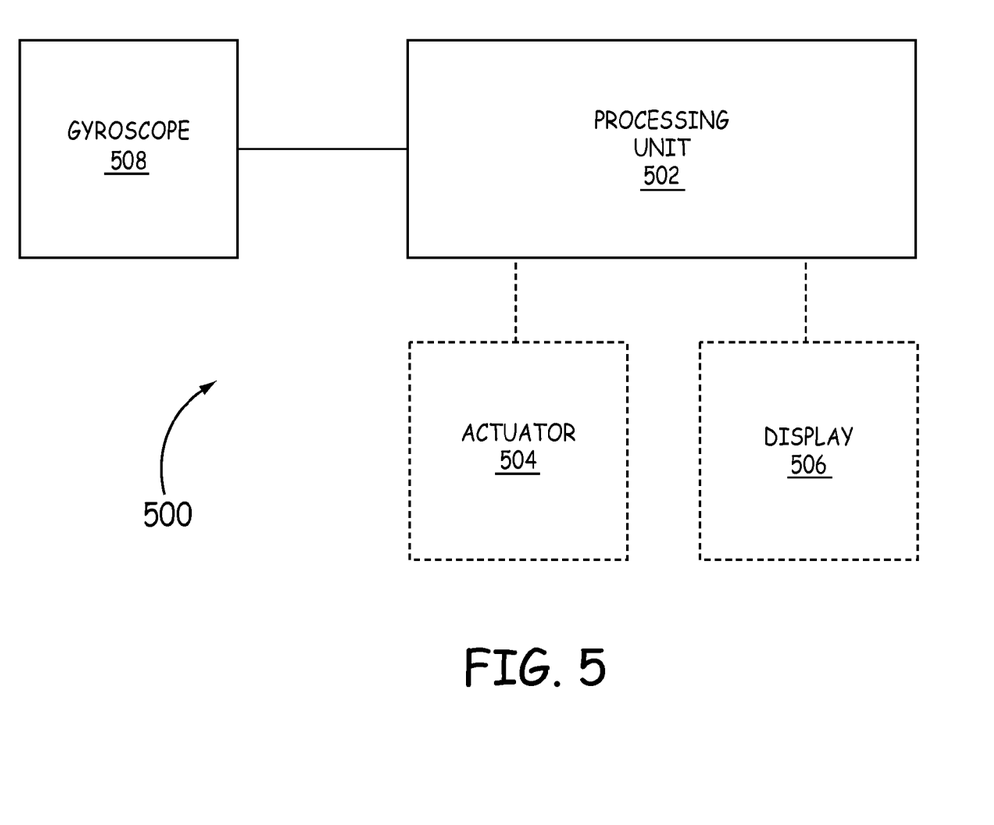
FIG. 5 is a block diagram depicting an exemplary system including a fast light ring laser gyroscope having an enhanced scale factor.

FIG. 5 is a block diagram depicting an exemplary system 500 including a fast light ring laser gyroscope having an enhanced scale factor. The system 500 includes a gyroscope 508, such as exemplary fast light ring laser gyroscope 100 described above. In addition to the gyroscope 508, the system 500 also includes a processing unit 502. The gyroscope 100 is communicatively coupled to the processing unit 502. The processing unit 502 includes a processor and memory. The processing unit 502 includes or functions with software programs, firmware or other computer readable instructions for carrying out various methods, process tasks, calculations, and control functions, used in the processing of signals from the gyroscope 508. For example, in some embodiments, system 500 is a navigation system. In such embodiments, the processing unit 502 calculates navigation parameters based on the signals from the gyroscope 508.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Some embodiments of the system 500 also include at least one actuator 504 and/or at least one display 506. The actuator 504 is actuated by the processing unit 502 based on information received from the gyroscope 508. For example, in some embodiments, the processing unit 502 provides control signals, based on calculated navigation parameters, to the actuator 504 to engage a flap, aileron, elevator, or other control surface on an aircraft. It is to be understood that the implementation of actuator 504 is dependent on the implementation of system 500. The display 506 outputs information received from, or related to, the gyroscope 508. For example, the display 506 could display the rotational rate of an aircraft, vehicle, or other object.

Figure 6:
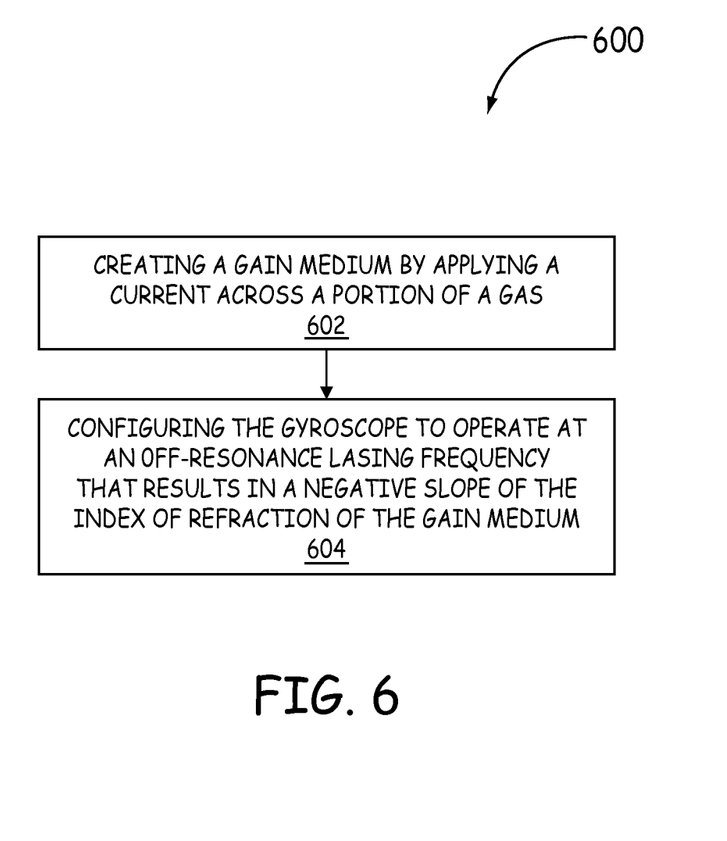
FIG. 6 is a flow chart depicting one embodiment of a method of making a fast light gyroscope.

FIG. 6 is a flow chart depicting one embodiment of a method 600 of increasing a scale factor of a fast light gyroscope. At block 602, a current is applied across a portion of a gas in a gyroscope cavity, making the gas present in the portion a gain medium having dispersive properties with an index of refraction. At block 604, the gyroscope is configured to operate at an off-resonant lasing frequency where the index of refraction associated with the gain medium has a negative slope. Because the index of refraction associated with the gain medium has a negative slope, the gain medium causes anomalous dispersion of light passing through the gain medium. The anomalous dispersion of the light passing through the gain medium results in an increased scale factor for the gyroscope as described above.

Although specific embodiments have been illustrated and described herein, it will be appreciated by those of ordinary skill in the art that any arrangement, which is calculated to achieve the same purpose, may be substituted for the specific embodiments shown. For example, although the exemplary embodiments described above operate using HeNe lasers, it is to be understood that other types of lasers could also be used. In addition, although the exemplary embodiments described above include ring laser gyroscopes having cavities shaped like equilateral triangles with mirrors placed at each of the three corners of the triangle, it is to be understood that the cavities could also be other shapes and greater or fewer mirrors could be used. Therefore, it is manifestly intended that this invention be limited only by the claims and the equivalents thereof.

What is claimed is:

1. A ring laser gyroscope comprising:
a cavity containing a gain medium having naturally dispersive properties associated with an index of refraction;
a plurality of reflective surfaces coupled to the cavity, comprising at least a first reflective surface, a second reflective surface, and a third reflective surface, wherein the first reflective surface, the second reflective surface, and the third reflective surface of the plurality of reflective surfaces reflect light along a path between the plurality of reflective surfaces when the ring laser gyroscope is operating; and
at least one medium exciter configured to excite the gain medium such that the excited gain medium is configured to induce first and second counter-propagating laser fields along the path within the cavity when the ring laser gyroscope is operating;
wherein the path has a length that induces the first and second laser fields at lasing frequencies away from the center of a gain profile for the ring laser gyroscope while the ring laser gyroscope is stationary when the ring laser gyroscope is operating, the lasing frequencies away from the center of the gain profile corresponding to negative slopes of the index of refraction associated with the naturally dispersive properties of the gain medium while the ring laser gyroscope is stationary; and
wherein the gain medium causes anomalous dispersion of the first and second laser fields passing through the gain medium at the frequencies away from the center of the gain profile when the ring laser gyroscope is operating.

2. The gyroscope of claim 1, wherein the gain medium is a gas.

3. The gyroscope of claim 2, wherein the gas is a helium neon gas.

4. The gyroscope of claim 2, wherein the at least one medium exciter comprises:
at least one current generating device that applies a current across the gas to excite the gain medium when the ring laser gyroscope is operating.

5. A method of increasing a scale factor in a ring laser gyroscope, the method comprising:
positioning a plurality of reflective surfaces within a cavity such that the plurality of reflective surface reflect light along a path between the plurality of reflective surfaces when the ring laser gyroscope is operating, wherein the path has a length;
creating a gain medium in the cavity such that the gain medium induces first and second counter-propagating laser fields along the path within the cavity when the ring laser gyroscope is operating, wherein the gain medium has naturally dispersive properties associated with an index of refraction;
configuring the length of the path such that the induced first and second laser fields operate at lasing frequencies away from the center of a gain profile for the ring laser gyroscope while the ring laser gyroscope is stationary when the ring laser gyroscope is operating, the lasing frequencies away from the center of the gain profile corresponding to negative slopes of the index of refraction associated with the naturally dispersive properties of the gain medium; and
wherein the gain medium causes anomalous dispersion of the first and second laser fields passing through the gain medium at the frequencies away from the center of the gain profile when the ring laser gyroscope is operating.

6. The method of claim 5, wherein creating the gain medium comprises filling a cavity with a gas.

7. The method of claim 6, wherein inducing the first and second counter-propagating laser fields along the path within the cavity when the ring laser gyroscope is operating comprises applying a current across a portion of the gas.

8. The method of claim 7, wherein the current is applied between at least one cathode and at least one anode positioned within the cavity.

9. The method of claim 8, wherein the gas is a helium neon gas.

10. The method of claim 6, further comprising selecting the length of the path for the off-center lasing frequency using the equation:

$$0 \geq \frac{dn_1}{d\omega}\bigg|_{\omega_0} \geq -\frac{L_{gyro}}{l_1 \omega_0}.$$

11. A system comprising:
a processing unit; and
a ring laser gyroscope coupled to the processing unit, the ring laser gyroscope including:
a cavity containing a gain medium having naturally dispersive properties associated with an index of refraction;
a plurality of reflective surfaces coupled to the cavity, comprising at least a first reflective surface, a second reflective surface, and a third reflective surface, wherein the first reflective surface, the second reflective surface, and the third reflective surface of the plurality of reflective surfaces reflect light along a path between the plurality of reflective surfaces when the ring laser gyroscope is operating; and
at least one medium exciter configured to excite the gain medium such that the excited gain medium is configured to induce first and second counter-propagating laser fields along the path within the cavity when the ring laser gyroscope is operating;
wherein the path has a length that induces the first and second laser fields at lasing frequencies away from the center of a gain profile for the ring laser gyroscope while the ring laser gyroscope is stationary when the ring laser gyroscope is operating, the lasing frequencies away from the center of the gain profile corresponding to negative slopes of the index of refraction associated with the naturally dispersive properties of the gain medium while the ring laser gyroscope is stationary; and wherein the gain medium causes anomalous dispersion of the first and second laser fields passing through the gain medium at the frequencies away from the center of the gain profile when the ring laser gyroscope is operating; and wherein the processing unit is configured to process signals output from the ring laser gyroscope to calculate at least one navigation parameter.

12. The system of claim 11, wherein the gain medium is a gas.

13. The system of claim 12, wherein the gas is a helium neon gas.

14. The system of claim 12, wherein the at least one medium exciter comprises:

at least one current generating device that applies a current across the gas to excite the gain medium when the ring laser gyroscope is operating.

* * * * *